(12) United States Patent
Liu et al.

(10) Patent No.: US 10,110,873 B2
(45) Date of Patent: Oct. 23, 2018

(54) BACKWARD DEPTH MAPPING METHOD FOR STEREOSCOPIC IMAGE SYNTHESIS

(71) Applicant: National Chiao Tung University, Hsinchu (TW)

(72) Inventors: Yu-Lun Liu, Hsinchu (TW); Hsueh-Ming Hang, Hsinchu (TW); Wen-Hsiang Tsai, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 263 days.

(21) Appl. No.: 14/799,639

(22) Filed: Jul. 15, 2015

(65) Prior Publication Data

US 2016/0205375 A1 Jul. 14, 2016

(30) Foreign Application Priority Data

Jan. 12, 2015 (TW) .............................. 104100910 A (51) Int. Cl.
*H04N 15/00* (2006.01)
*H04N 13/00* (2018.01)
(Continued)

(52) U.S. Cl.
CPC ......... *H04N 13/128* (2018.05); *G06T 15/205* (2013.01); *H04N 13/0011* (2013.01); *H04N 13/0022* (2013.01)

(58) Field of Classification Search
CPC ........... H04N 13/0022; H04N 13/0011; H04N 13/128; G06T 15/205
(Continued)

(56) References Cited

U.S. PATENT DOCUMENTS 6,215,496 B1 * 4/2001 Szeliski .................. G06T 15/04
345/419
9,253,486 B2 * 2/2016 Tian ...................... H04N 19/597
(Continued)

FOREIGN PATENT DOCUMENTS

CN 102831603 A * 12/2012

OTHER PUBLICATIONS

Li D-H., H.M. Hang, and Y-L. Liu, "Virtual View Synthesis Using Backward Depth Warping Algorithm", Picture Coding Symposium (PCS), 2013, Dec. 8-11, 2013, doi: 10.1109/PCS.2013.6737719.*
(Continued)

*Primary Examiner* — Mohammed Rahaman
*Assistant Examiner* — Richard A Hansell, Jr.
(74) *Attorney, Agent, or Firm* — Mintz Levin Cohn Ferris Glovsky and Popeo, P.C.; Peter F. Corless; Steven M. Jensen (57) ABSTRACT

A backward depth mapping method for stereoscopic image synthesis includes: providing a first coordinate and a first depth value of a pixel of a virtual view in a stereoscopic image; calculating a second coordinate and a second depth value of a pixel of reference view, which is obtained by mapping the virtual view, based on the first coordinate and the first depth value of the pixel of the virtual view; calculating an error value corresponding to the first depth value based on the second coordinate and second depth value; and determining a third depth value of the pixel of the virtual view based on the error value. As a result, it is possible to avoid the virtual view producing a crack and the pixel of the background from appearing at the crack of the foreground.

7 Claims, 7 Drawing Sheets (51) Int. Cl.
    *H04N 13/128* (2018.01)
    *G06T 15/20* (2011.01)
(58) Field of Classification Search
    USPC .......................................................... 348/43
    See application file for complete search history.

(56) References Cited

U.S. PATENT DOCUMENTS

| | | | |
|---|---|---|---|
| 9,264,691 B2* | 2/2016 | Zou | H04N 19/597 |
| 9,407,896 B2* | 8/2016 | Lam | H04N 13/0011 |
| 2011/0148858 A1* | 6/2011 | Ni | H04N 13/128 |
| | | | 345/419 |
| 2014/0098100 A1* | 4/2014 | Dane | H04N 13/0271 |
| | | | 345/427 |

OTHER PUBLICATIONS

Szeliski R., "Computer Vision: Algorithms and Applications", Sep. 3, 2010 draft.*

* cited by examiner

BACKWARD DEPTH MAPPING METHOD FOR STEREOSCOPIC IMAGE SYNTHESIS

CROSS-REFERENCES TO RELATED APPLICATIONS

This application claims under 35 U.S.C. § 119(a) the benefit of Taiwanese Application No. 104100910, filed Jan. 12, 2015, the entire contents of which are incorporated herein by reference.

TECHNICAL FIELD

This present invention relates to backward depth mapping methods, and more specifically, relates to a backward depth mapping method for stereoscopic (three dimensional) image synthesis.

BACKGROUND

Figure 1:
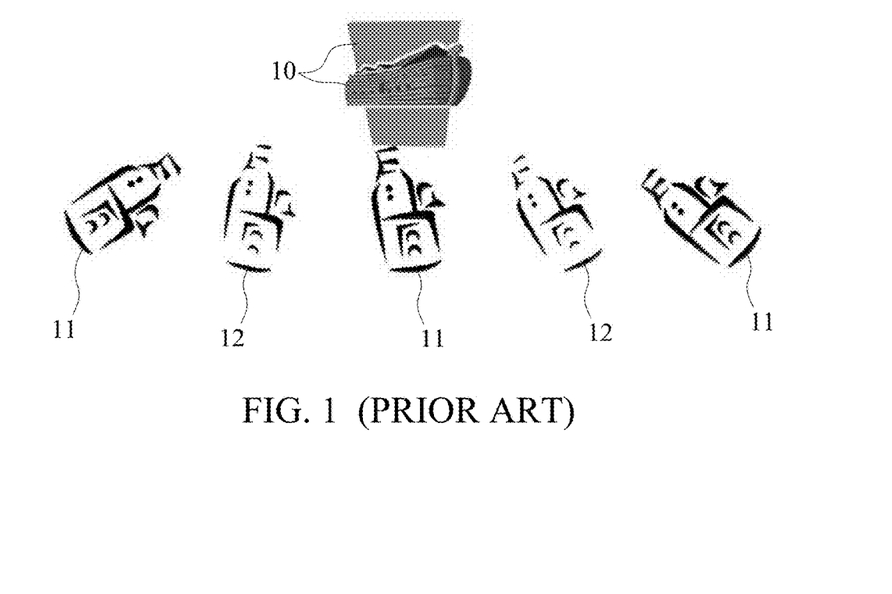
FIG. 1 depicts a schematic diagram of generating a new perspective by the depth image based rendering method in prior art.

FIG. 1 depicts a schematic diagram of generating a new perspective by the depth image based rendering method in the prior art. As shown in the drawing, because the visual point synthesis is an important part of stereoscopic (3D) image generation, it usually uses a plurality of staggered reference cameras 11 and virtual cameras 12 to generate a virtual visual point of the stereoscopic image 10, utilizes the depth image based rendering method to conduct visual point synthesis, and uses the information of color and depth to create the new perspective.

Figure 2:
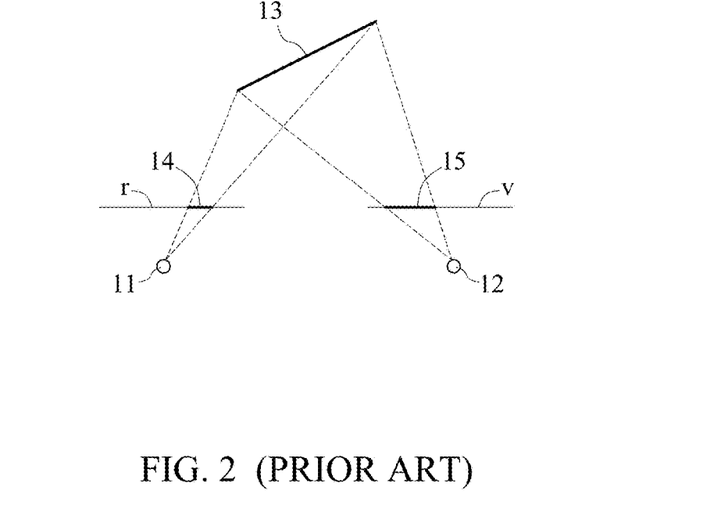
FIG. 2 depicts a schematic diagram of the mapping status of the reference view and the virtual view in prior art.

FIG. 2 depicts a schematic diagram of the mapping status of the reference view and the virtual view in prior art. As shown in the drawing, the size of the object 15 in the virtual view v is larger than the size of the object 14 in the reference view r. This characteristic is especially happened in the inclined object 13 or in the synthetic extrapolated image. In this situation, if using the reference view r as the reference and mapping every pixel of the reference view r to the virtual view v, some pixels in the virtual view v will not be mapped by any pixel in the reference view r. In order to fix the flaw, the traditional method uses the median filter in the depth map after mapping to fill the pixel gaps between these pixels, but the median filter will damage the depth edge of the virtual view v.

Figure 3A:
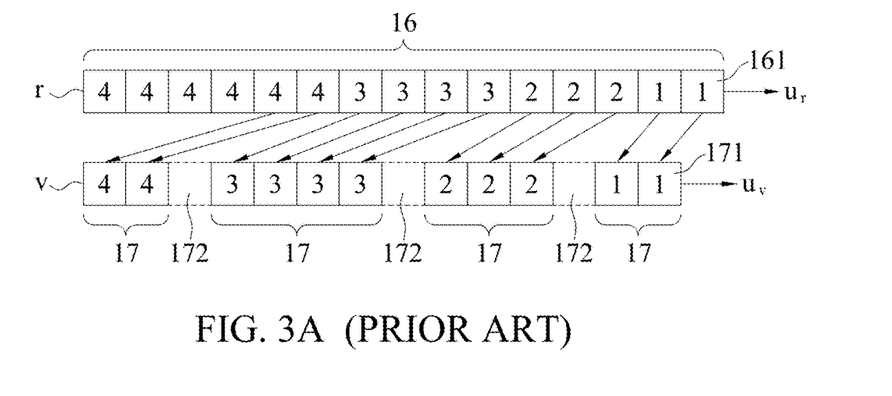
FIGS. 3A and 3B depict schematic diagrams of mapping the reference view to the virtual view by the forward depth mapping method, respectively, in prior art.
Figure 3B:
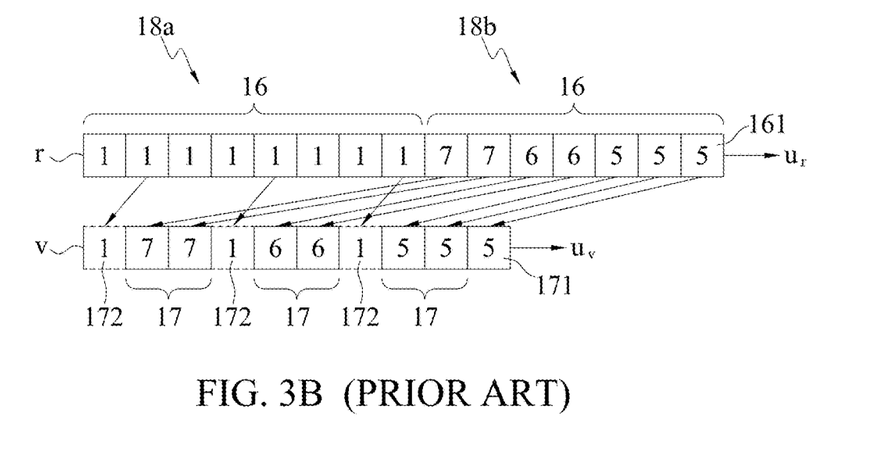
Figure 4A:
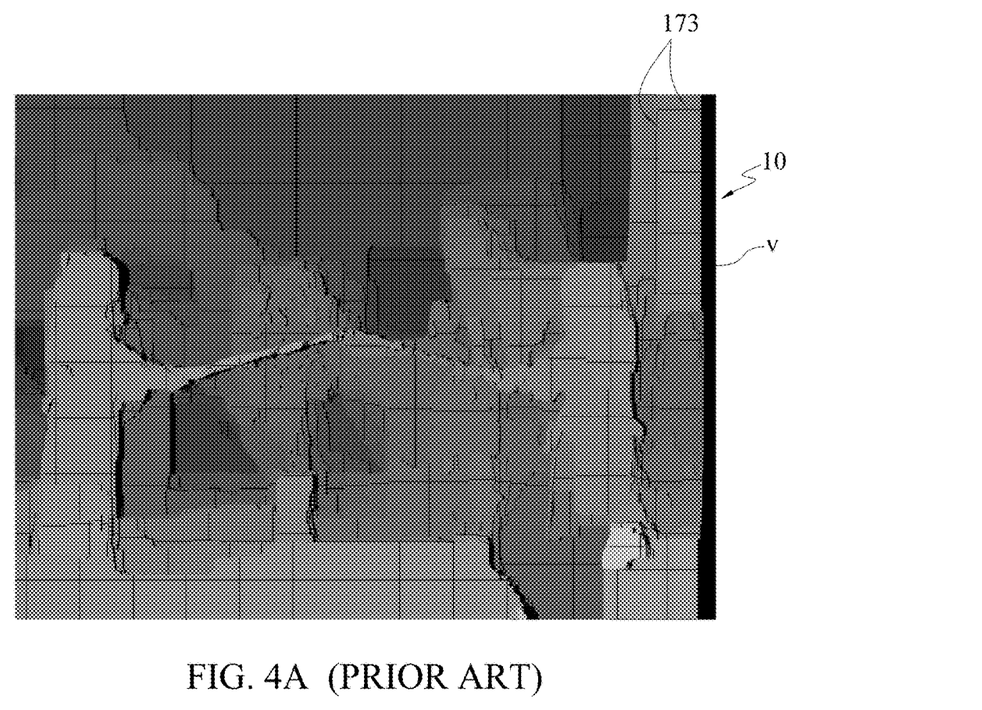
FIGS. 4A and 4B depict the depth maps of the virtual view of the stereoscopic image generated by the forward depth mapping method in prior art, respectively.
Figure 4B:
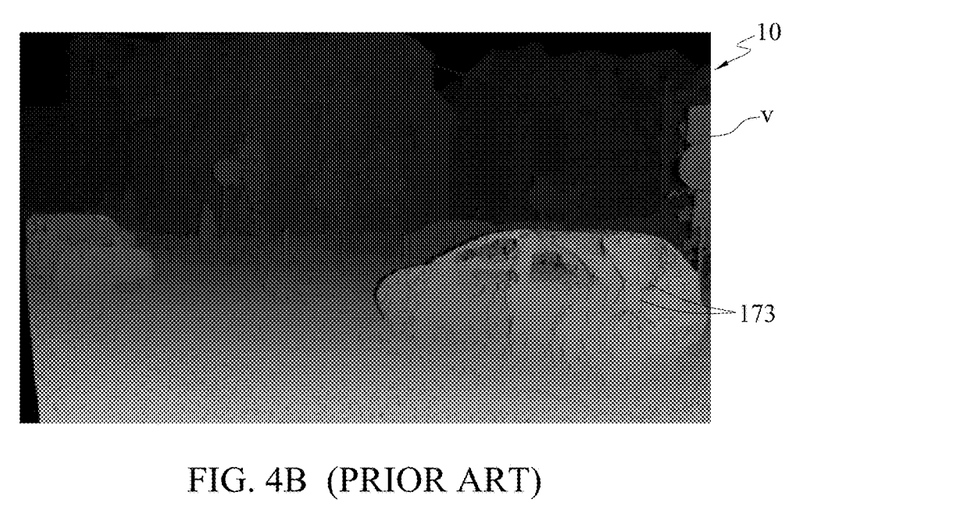

FIG. 3A and FIG. 3B depict schematic diagrams of mapping the reference view to the virtual view by the forward depth mapping method, respectively, in the prior art. FIG. 4A and FIG. 4B depict depth maps of the virtual view of generating stereoscopic image by the forward depth mapping method, respectively, in the prior art.

As shown in FIG. 3A and FIG. 3B, in the traditional depth mapping method, the forward mapping is used in the left depth map and the right depth map to generate the depth map of the virtual view v. However, due to the limitation of both the horizontal coordinate $u_v$ and the vertical coordinate of the pixel 17 of the virtual view v are integer values, the depth map after mapping may generate some pixel gaps between the plurality of the pixels 17. Therefore, the crack 173 of the virtual view v of the stereoscopic image 10 in FIG. 4A and FIG. 4B is generated. In FIG. 3A and FIG. 3B, the depth value of the pixel 16 of the reference view r can be derived from the disparity 161. The depth value of the pixel 17 of the virtual view v can be derived from the disparity 171.

In the first quantitative error of the forward depth mapping method of FIG. 3A, the crack 173 of FIGS. 4A and FIG. 4B will occur in the inclined object. In the second quantitative error of the forward depth mapping method of FIG. 3B, when mapping the pixels 16 of the reference view r to the virtual view v, the disparity 161 (or depth value) of the pixel 16 of the reference view r will be mapped to the pixel gap 172 of the pixel 17 of the virtual view v as the disparity 171 (or depth value), so that the content of the background 18a will appear in the content of the foreground 18b.

The cause of the above two quantitative errors is that the prior art maps every pixel 16 from the reference view r to the virtual view v. Therefore, after the horizontal coordinates $u_v$, the vertical coordinates and disparities 161 (or depth values) of the pixels 16 of the reference view r being rounded off, the plurality of pixels 16 of the reference view r cannot be all mapped to the plurality of the pixels 17 of the virtual view v, so that the pixel gap 172 and the crack 173 will be generated between the plurality of the pixels 17 of the virtual view v.

Consequently, how to overcome the above problem of prior art, in fact, has become anxious to resolve the issue.

SUMMARY

The present invention provides a backward depth mapping method for stereoscopic image synthesis, which can prevent the virtual view from generating pixel gaps or crack and prevent the pixels of backward from appearing in the crack of the frontward.

The backward depth mapping method comprises: providing a first coordinate and a first (predetermined) depth value of a pixel of a virtual view in a stereoscopic image; calculating a second coordinate and a second depth value of a pixel of a reference view, which is obtained by mapping the virtual view, based on the first (predetermined) coordinate and the first depth value of the pixel of the virtual view; calculating an error value corresponding to the first (predetermined) depth value of the pixel of the virtual view based on the second coordinate and second depth value of the pixel of the reference view; and determining a third (actual) depth value of the pixel of the virtual view based on the error value corresponding to the first (predetermined) depth value of the pixel of the virtual view.

The backward depth mapping method can further comprise: determining whether the error value corresponding to the first (predetermined) depth value of the pixel of the virtual view is smaller than the error value corresponding to a previous first (predetermined) depth value of the pixel of the virtual view before determining the third (actual) depth value of the pixel of the virtual view.

If the error value corresponding to the first (predetermined) depth value of the pixel of the virtual view is smaller than the error value corresponding to the previous first (predetermined) depth value of pixel of the virtual view, a next first (predetermined) depth value of the pixel of the virtual view is provided, and then the error value corresponding to the next first (predetermined) depth value of the pixel of the virtual view is calculated by ascending or descending approach.

If the error value corresponding to the first (predetermined) depth value of the pixel of the virtual view is larger than the error value corresponding to the previous first (predetermined) depth value of the pixel of the virtual view, the error value corresponding to the previous first (predetermined) depth value of the pixel of the virtual view is determined as to whether it is smaller than a threshold value.

When the error value corresponding to the previous first (predetermined) depth value of the pixel of the virtual view is smaller than the threshold value, the previous first (predetermined) depth value of the pixel of the virtual view is used as the third (actual) depth value of the pixel of the virtual view.

The second coordinate and the second depth value of pixel of reference view are calculated based on the following backward depth mapping algorithm:

$$A^{-1}\left(z_v\begin{bmatrix}u_v\\v_v\\1\end{bmatrix}-b\right)=z'\begin{bmatrix}u'\\v'\\1\end{bmatrix}$$

The error value is calculated based on the following error value algorithm:

$$E=\min_{\substack{u_r=floor(u')\ or\ ceil(u')\\v_r=floor(v')\ or\ ceil(v')}}[(u_r-u')^2+(v_r-v')^2+(D(u_r,v_r)-z')^2]$$

Apparent from the above, the backward depth mapping method for stereoscopic image synthesis of the present invention mainly uses the backward depth mapping algorithm and the error value algorithm, maps the first coordinate and the first (predetermined) depth value of the pixel of the virtual view to the second coordinate and the second depth value of the pixel of the reference view, calculates the error value corresponding to the first (predetermined) depth value of the pixel of the virtual view based on the second coordinate and second depth value of the pixel of the reference view, and determines a third (actual) depth value of the pixel of the virtual view based on the error value corresponding to the first (predetermined) depth value of the pixel of the virtual view.

Therefore, the present invention can solve the problem in the prior art that the pixel gaps are generated between the plurality of pixels of the virtual view, so as to avoid the virtual view of the stereoscopic image from generating cracks. In the meanwhile, the present invention can overcome the situation in the prior art that the pixels of the backward of the reference view are mapped into the pixel gaps of the pixels of the virtual view, so as to avoid the pixels of the backward from appearing in the crack of the frontward after mapping, and to further improve the quality of the virtual view of stereoscopic image synthesis.

DETAILED DESCRIPTION

The detail description of the disclosure is described by specific embodiments in the following. Those with ordinary skills in the arts can readily understand the advantages and functions of the present invention after reading the disclosure of this specification.

Figure 5:
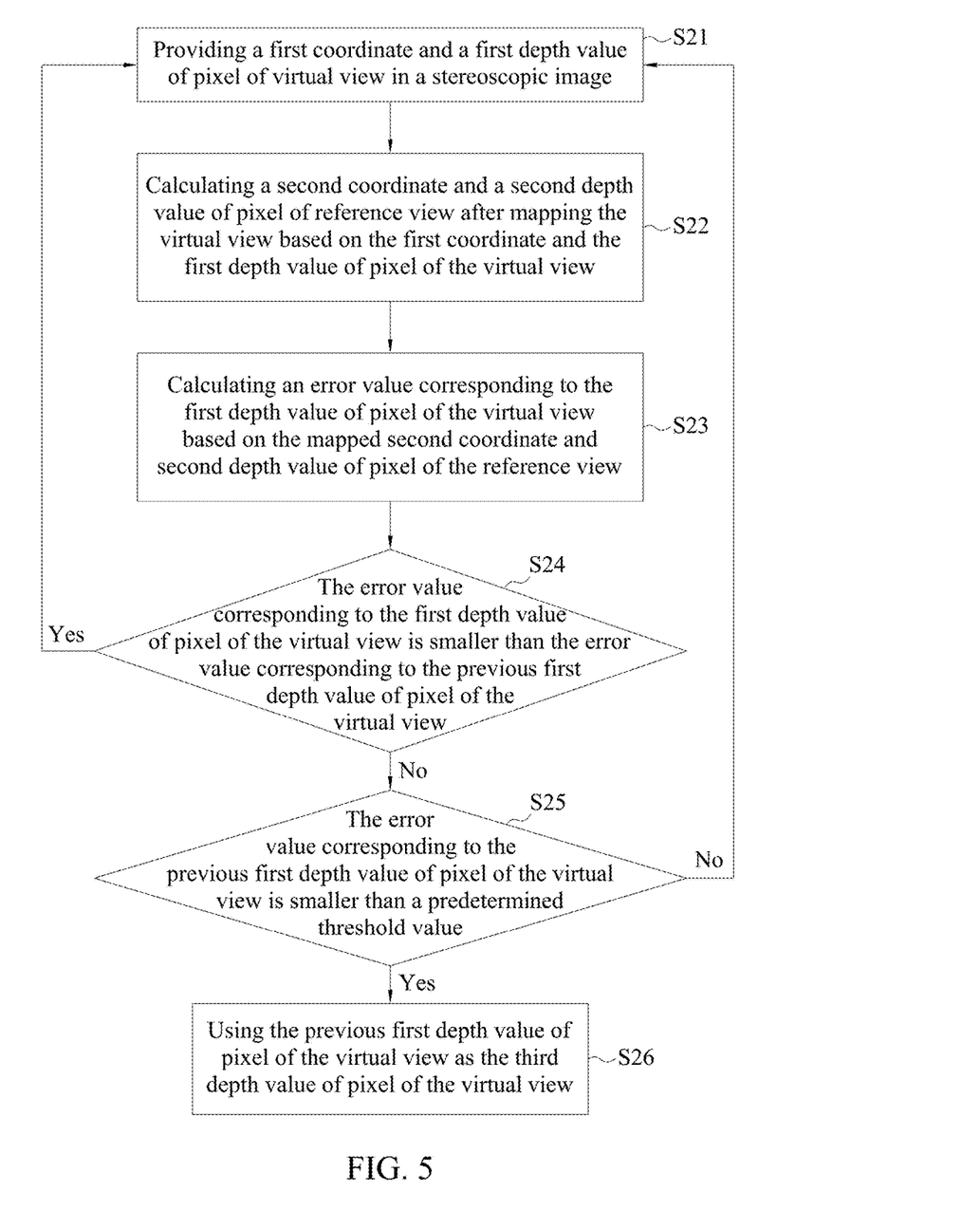
FIG. 5 depicts the procedure of the backward depth mapping method for stereoscopic image synthesis in the present invention.
Figure 6A:
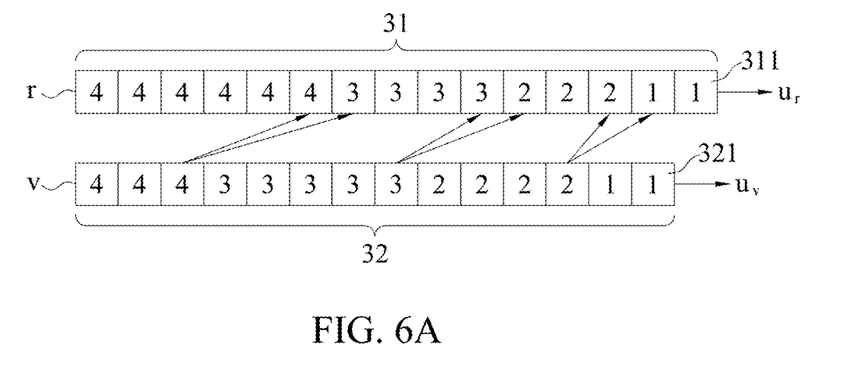
FIGS. 6A and 6B depict schematic diagrams of mapping the reference view to the virtual view by the backward depth mapping method in the present invention, respectively.
Figure 6B:
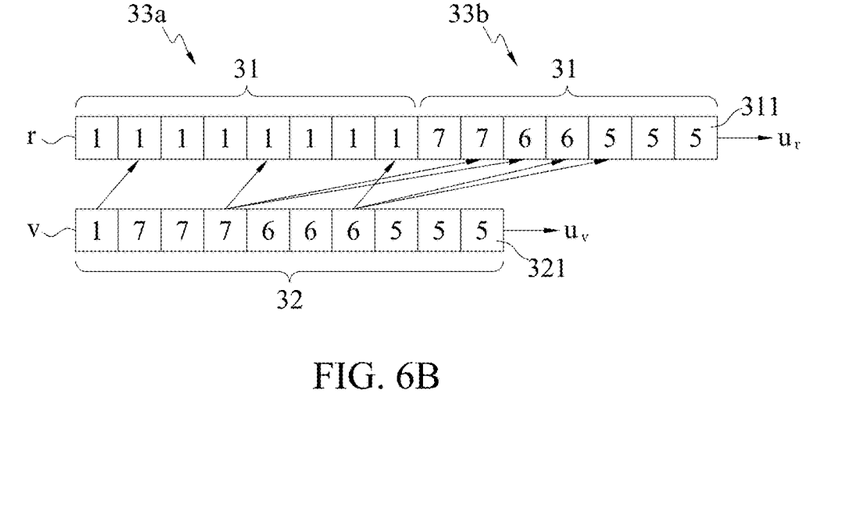
Figure 7:
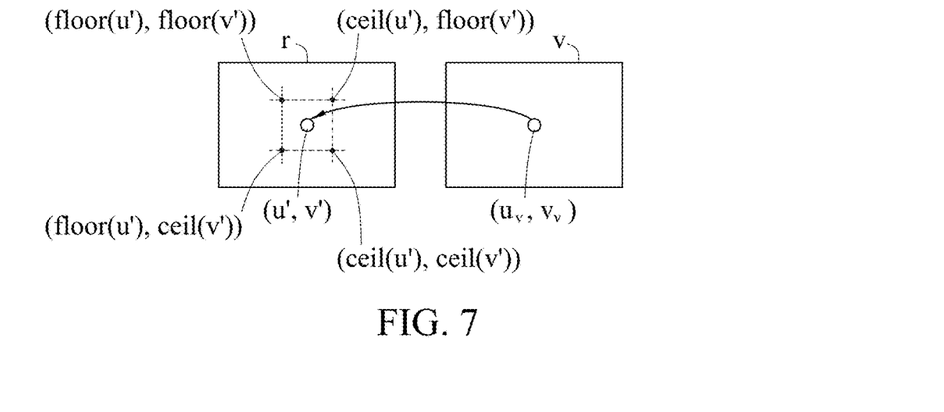
FIG. 7 depicts the corresponding relationship of the coordinates and depth values of the pixels of the virtual view and its mapped reference view in the present invention.
Figure 8A:
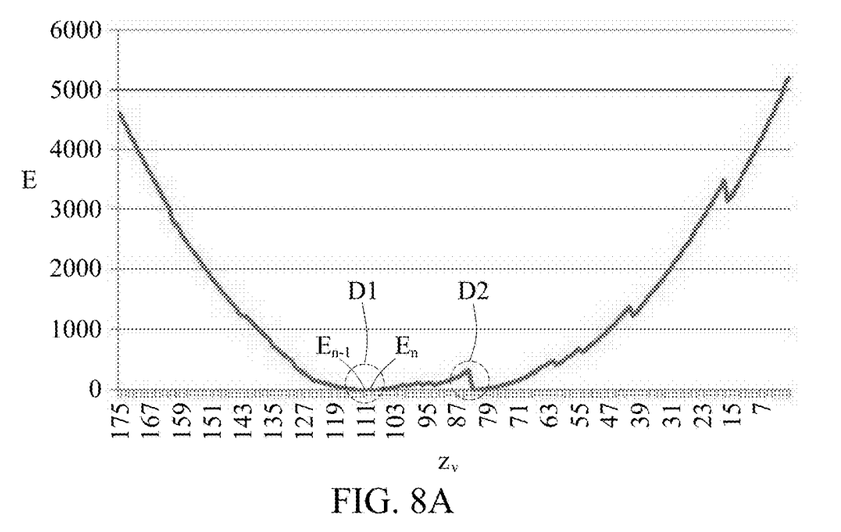
FIGS. 8A and 8B depict the corresponding relationships of the predetermined depth value and the error value of the pixels of the virtual view in the present invention, respectively.
Figure 8B:
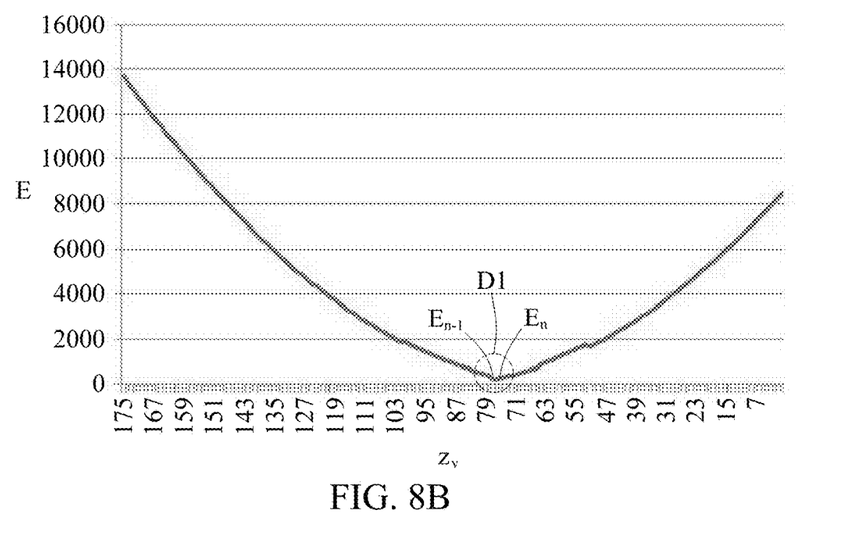
Figure 9A:
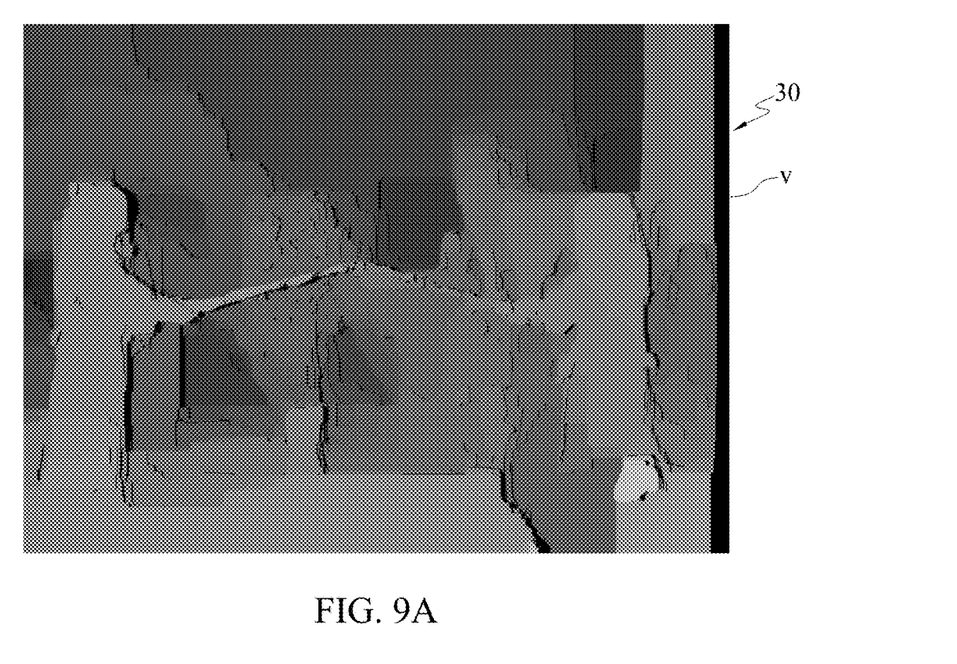
FIGS. 9A and 9B depict the depth maps of the virtual view of the stereoscopic image generated the backward depth mapping method in the present invention.
Figure 9B:
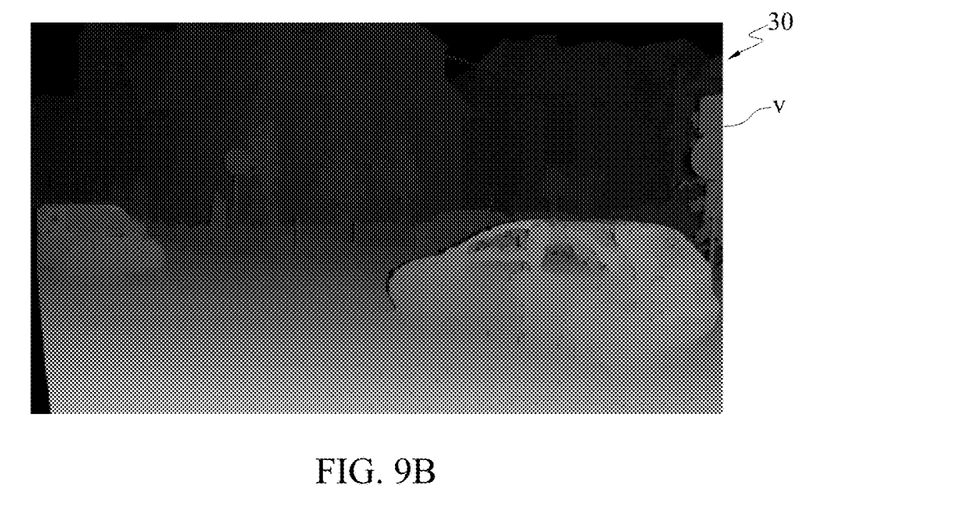

FIG. 5 depicts the procedure of the backward depth mapping method for stereoscopic image synthesis in the present invention. FIGS. 6A and 6B depict schematic diagrams of mapping the reference view to the virtual view by the backward depth mapping method in the present invention, respectively. FIG. 7 depicts the corresponding relationship of the coordinates and depth values of the pixels of the virtual view and its reference view obtained by mapping the virtual view in the present invention. FIGS. 8A and 8B depict the corresponding relationships of the predetermined depth value and the error value of the pixels of the virtual view in the present invention, respectively. FIGS. 9A and 9B depict the depth maps of the virtual view of the stereoscopic image generated the backward depth mapping method in the present invention.

As shown in FIG. 5 to FIG. 8B, the backward depth mapping method of the present invention can be applied to electronic devices (such as, stereo TVs) or any electronic devices having the function of stereoscopic image synthesis (not shown). The backward depth mapping method mainly comprises the following steps.

In the step S21 of FIG. 5 and FIG. 6A to FIG. 8B, it first provides the first coordinate and the first (predetermined) depth value $z_v$ of the pixel 32 of the virtual view v in the stereoscopic image of the electronic device. The first (predetermined) depth value $z_v$ is of no units and can be represented by predetermined, assumed, possible or potential depth value. The first coordinate of the pixel 32 of the virtual view v can include the horizontal coordinate $u_v$ and the vertical coordinate $v_v$, and the first (predetermined) depth value $z_v$ of the pixel 32 of the virtual view v is obtained from one of a series consisting of a plurality of integer values (such as the depth value of 255 to 1). Next, move forward to the step S22 of FIG. 5.

In the step S22 of FIG. 5 and FIG. 6A to FIG. 8B, using the internal or external processor (such as the CPU or arithmetical logic unit) or processing program of the electronic device, it calculates the second coordinate (the horizontal coordinate u' and the vertical coordinate v') and the second depth value z' of pixel 31 of a reference view r obtained by mapping the virtual view v, based on the first coordinate (the horizontal coordinate $u_v$ and the vertical coordinate $v_v$) and the first (predetermined) depth value $z_v$ of the pixel 32 of the virtual view v, as shown in the following backward depth mapping algorithm (1).

The second coordinate (the horizontal coordinate u' and the vertical coordinate v') and the second depth value z' of the pixel 31 of the reference view r can be calculated based on the following backward depth mapping algorithm (1):

$$A^{-1}\left(z_v\begin{bmatrix}u_v\\v_v\\1\end{bmatrix}-b\right)=z'\begin{bmatrix}u'\\v'\\1\end{bmatrix} \quad (1)$$

In the meanwhile, the above backward depth mapping algorithm (1) can be obtained by modifying the forward depth mapping method (2) in the prior art:

$$z_v\begin{bmatrix}u_v\\v_v\\1\end{bmatrix}=z_rA\begin{bmatrix}u_r\\v_r\\1\end{bmatrix}+b \quad (2)$$

In the above depth mapping algorithm (1) and the forward depth mapping method (2), $A^{-1}$ is the inverse matrix, b is the 3 by 1 matrix, $u_v$, $v_v$, and $z_v$ are the horizontal coordinates, the vertical coordinates and the depth values of the pixels 32 of the virtual view v, respectively, and u', v', and z' are the horizontal coordinates, the vertical coordinates and the depth values of the pixels 31 of the reference view r after mapping, respectively, and $z_r$ represents the depth value of pixel 31 of virtual view r (such as 255 to 1).

The above depth mapping algorithm (1) can also comprise the following equation (3):

$$\begin{cases} A = Q_v Q_r^{-1} & b = Q_v(c_r - c_v) \\ Q_v = K_v \cdot R_v & Q_r = K_r \cdot R_r \\ c_r = -R_r^T \cdot t_r & c_v = -R_v^T \cdot t_v \end{cases} \quad (3)$$

In the above equation (3), A is the 3 by 3 matrix, $K_v$ and $K_r$ are the internal parameters of the virtual view v and the reference view r, respectively, $R_v$ and $R_r$ are the rotation matrix of the virtual view v and the reference view r, respectively, $t_v$ and $t_r$ are the translation vectors of the virtual view v and the reference view r, respectively, and T is the transpose matrix. Next, move forward to the step S23 of FIG. 5.

In the step S23 of FIG. 5 and FIG. 6A to FIG. 8B, it calculates the error value E (no units) corresponding to the first (predetermined) depth value $z_v$ of the pixel 32 of the virtual view v based on the mapped second coordinate (the horizontal coordinate u' and the vertical coordinate v') and second depth value z' of the pixel 31 of the reference view r.

The error value E can be calculated based on the following error value algorithm (4):

$$E = \min_{\substack{u_r = floor(u') \text{ or } ceil(u') \\ v_r = floor(v') \text{ or } ceil(v')}} [(u_r - u')^2 + (v_r - v')^2 + (D(u_r, v_r) - z')^2] \quad (4)$$

In the above error value algorithm (4), $u_r$, $v_r$, and $D(u_r, v_r)$ are the horizontal coordinates, the vertical coordinates and the depth values of pixels 31 of the reference view r, respectively, floor(u') and floor(v') are floor functions to obtain the horizontal coordinate u' and the vertical coordinate v' of the pixel 31 of the reference view r, respectively, ceil(u') and ceil(v') are ceiling functions to obtain the horizontal coordinate u' and the vertical coordinate v' of the pixel 31 of the reference view r, respectively, and min represents to obtain the minimum value.

Because all the horizontal coordinate u' and the vertical coordinate v' and second depth value z' of pixel 31 of the reference view r are floating point number, i.e., the value having decimals, the floor function floor(u') and the floor function floor(v') can be used to obtain the integer values larger than the horizontal coordinate u' and the vertical coordinate v' of the pixel 31 of the reference view r obtained mapping the virtual view v, respectively, and the ceiling function ceil(u') and the ceiling function ceil(v') can be used to obtain the integer values smaller than the horizontal coordinate u' and the vertical coordinate v' of the pixel 31 of the reference view r, respectively.

Moreover, in the above error value algorithm (4), $u_r$=floor(u') or ceil(u') and $y_r$=floor(v') or ceil(v') represents the pixels having the four integer values near the horizontal coordinate and the vertical coordinate (u', v') of the pixel 31 of the reference view r, i.e., the first pixel (floor(u'), floor(v')), the second pixel (floor(u'), ceil(v')), the third pixel (ceil(u'), floor(v')), and the forth pixel (ceil(u'), ceil(v')), as shown in FIG. 7.

Therefore, assuming the horizontal coordinate and the vertical coordinate (u', v') of the pixel 31 of the reference view r=(1.23, 3.45), the first pixel (floor(u'), floor(v'))=(1, 3), the second pixel (floor(u'), ceil(v'))=(1, 4), the third pixel (ceil(u'), floor(v'))=(2, 3), and the forth pixel (ceil(u'), ceil(v'))=(2, 4). Accordingly, the error value E can be calculated by substituting the above values of the first pixel to the forth pixel into the above error value algorithm (4). Then, one can preliminarily determine whether the depth value $z_v$ of pixel 32 of the virtual view v is obtained or not, based on the error value E.

In order to obtain a correct or better third (actual) depth value $z_v$ of the pixel 32 of the virtual view v, the present invention can continue to conduct the following step S24 to S26 of FIG. 5.

In the step S24 of FIG. 5 and FIG. 6A to FIG. 8B, before determining the third (actual) depth value $z_v$ of the pixel 32 of the virtual view v, one can determine whether the error value E corresponding to the first (predetermined) depth value $z_v$ of the pixel 32 of the virtual view v is smaller than the error value E corresponding to the previous first (predetermined) depth value $z_v$ of the pixel 32 of the virtual view v or not. If yes, go back to the step S21 of FIG. 5. If not, move forward to the step S25 of FIG. 5.

When going back to the step S21, it means that the error value $E_n$ corresponding to the first (predetermined) depth value $z_v$ of the pixel 32 of the virtual view v is smaller than the error value E corresponding to the previous first (predetermined) depth value $z_v$. Then, a next first (predetermined) depth value $z_v$ of the pixel 32 of the virtual view v is provided, and the error value E corresponding to the next first (predetermined) depth value $z_v$ is calculated by ascending or descending approach. The descending approach can be downward obtaining the next depth value (such as the depth value of 100) smaller than the current depth value (such as the depth value of 101) from a plurality of the first (predetermined) depth value $z_v$ (such as the depth value of 255 to 1), and the ascending approach can be upward obtaining the next depth value (such as the depth value of 102) larger than the current depth value (such as the depth value of 101) from a plurality of the first (predetermined) depth value $z_v$ (such as the depth value of 1 to 255). Referring to FIG. 8A and FIG. 8B, only a part of the depth value $z_v$ is shown in the drawing for illustration.

In the step S25 of FIG. 5 and FIG. 6A to FIG. 8B, if the error value $E_n$ corresponding to the first (predetermined) depth value $z_v$ of the pixel 32 of the virtual view v is not smaller than (i.e., equal to or larger than) the error value E corresponding to the previous first (predetermined) depth value $z_v$, the error value E corresponding to the previous first (predetermined) depth value $z_v$ of the pixel 32 of the virtual view v is determined as to whether it is smaller than a threshold value δ or not. If not, go back to the step S21; if yes, move forward to the step S26.

When going back to the step S21, it means that the error value $E_n$ corresponding to the first (predetermined) depth value $z_v$ of the pixel 32 of the virtual view v is not smaller than (i.e., equal to or larger than) the threshold value δ. Similarly, the next first (predetermined) depth value $z_v$ of pixel 32 of the virtual view v is provided, and the error value E corresponding to the next first (predetermined) depth value $z_v$ is further calculated by ascending or descending approach.

In the step S26 of FIG. 5 and FIG. 6A to FIG. 8B, when the error value $E_n$ corresponding to the first (predetermined) depth value $z_v$ of pixel 32 of the virtual view v is smaller than the threshold value δ the previous first (predetermined) depth value $z_v$ of the pixel 32 of the virtual view v is used as the third (actual) depth value $z_v$ of the pixel 32 of the virtual view v, and the error value E corresponding to the previous first (predetermined) depth value $z_v$ of the pixel 32 of the virtual view v is the first minimum error value smaller than the threshold value δ.

For the embodiment related to the above steps S24 to S26 in FIG. 5, for example, as shown in FIG. 8A (please also refer to FIG. 6A to FIG. 7), it assumes that the error value E (such as the error value $E_n$=0.01) corresponding to the first (predetermined) depth value $z_v$ (such as the depth value $z_v$=111) of the pixel 32 of the virtual view v is larger than the error value E (such as the error value $E_{n-1}$=0.0615) corresponding to the previous first (predetermined) depth value $z_v$ (such as the depth value $z_v$=110) of the pixel 32 of the virtual view v, and the error value E is further determined to be smaller than the threshold value δ(for example, the threshold value δ=0.75). Accordingly, the previous first (predetermined) depth value $z_v$ (such as the depth value $z_v$=110) of the pixel 32 of the virtual view v can be used as the third (actual) depth value $z_v$ of the pixel 32 of the virtual view v. Also, the previous first (predetermined) depth value $z_v$ is located in the first region D1, i.e., the previous first (predetermined) depth value $z_v$ is the predetermined depth value $z_v$ corresponding to the first error value E smaller than the threshold value δ.

For a further example, as shown in FIG. 8A (please also refer to FIG. 6A to FIG. 7), it assumes that the error value E (such as the error value $E_n$=0.02) corresponding to the first (predetermined) depth value $z_v$ (such as the depth value $z_v$=84) of the pixel 32 of the virtual view v is larger than the error value E (such as the error value $E_{n-1}$=0.01) corresponding to the previous first (predetermined) depth value $z_v$ (such as the depth value $z_v$=83) of the pixel 32 of the virtual view v, and the error value E is further determined to be smaller than the threshold value δ(for example, the threshold value δ=0.75). Although the previous first (predetermined) depth value $z_v$ (such as the depth value $z_v$=83) of the pixel 32 of the virtual view v can also be used as the depth value $z_v$ of the pixel 32 of the virtual view v, the previous first (predetermined) depth value $z_v$ is located in the second region D2, i.e., the previous first (predetermined) depth value $z_v$ is the predetermined depth value $z_v$ corresponding to the second error value E smaller than the threshold value δ. Therefore, according to the z-buffer method, the abovementioned predetermined depth value $z_v$ corresponding to the first error value E smaller than the threshold value δwill be selected, for example, the depth value $z_v$=110 of the first region will be selected rather than the depth value $z_v$=83 of the second region, so as to prevent the pixel 32 in the shaded area of the virtual view v from obtaining a wrong depth value $z_v$.

For another example, as shown in FIG. 8B (please also refer to FIG. 6A to FIG. 7), it assumes that the error value E (such as the error value $E_n$=230) corresponding to the first (predetermined) depth value $z_v$ (such as the depth value $z_v$=78) of the pixel 32 of the virtual view v is larger than the error value E (such as the error value $E_{n-1}$=225.731) corresponding to the previous first (predetermined) depth value $z_v$ (such as the depth value $z_v$=77) of pixel 32 of the virtual view v, and the error value E (such as the error value $E_{n-1}$=225.731) corresponding to the previous first (predetermined) depth value $z_v$ is further determined to be not smaller than the threshold value δ (for example, the threshold value δ=0.75). Then, the next first (predetermined) depth value $z_v$ of the pixel 32 of the virtual view v is provided by descending approach, and the error value E corresponding to the next first (predetermined) depth value $z_v$ is further calculated, i.e., go back to the step S21 from the above step S25 of FIG. 5.

As shown in the above FIG. 5 to FIG. 8B, the present invention uses the backward depth mapping method to mapping the horizontal coordinate $u_v$, the vertical coordinate $v_v$, and the predetermined depth value $z_v$ of the pixel 32 of the virtual view v to the horizontal coordinate u', the vertical coordinate v', and the depth value z' of pixel 31 of the reference view r, so as to obtain a correct or better third (actual) depth value $z_v$ of pixel 32 of the virtual view v.

In FIG. 6A and FIG. 6B, the depth value $z_v$ of the pixel 32 of the virtual view v and the depth value z' of the pixel 31 of the reference view r are note shown in the present invention, because the depth value $z_v$ and the depth value z' can be derived from the disparity 321 and the disparity 311 (e.g., the value 4, 3, 2, 1 of the disparity 311, 321 of FIG. 6A). In addition, the larger the disparity 321 (or the disparity 311), the smaller the depth value $z_v$ (or the depth value z') and the closer the distance. Conversely, the smaller the disparity 321 (or the disparity 311), the larger the depth value $z_v$ (or the depth value z') and the further the distance.

In the meanwhile, in FIG. 6A and FIG. 6B, it is apparent that every pixel 32 of the virtual view v can correspond to the disparity 311 (or the depth value) of the reference view r, so that there is no pixel gap between the plurality of pixels 32 of FIG. 6A and the plurality of pixels 31 of the background 33a of the reference view r in FIG. 6B will not appear in the plurality of pixels 31 of the foreground 33b after mapping. Accordingly, the virtual view v of the stereoscopic image 30 with no crack or being better in FIG. 9A and FIG. 9B can be obtained.

Therefore, the present invention can solve the problem of the prior art that the pixel gap 172 will be generated between the plurality of the pixels 17 of the virtual view v, as shown in FIG. 3A, so as to prevent the situation that the crack 173 will be generated in the virtual view v of the stereoscopic image 30 in the prior art, as shown in FIGS. 4A and 4B. In addition, the present invention can overcome the situation that the pixel 16 of the background 18a of the reference view r will be mapped into the pixel gap 172 of the pixels 17 of the virtual view v, as shown in FIG. 3B, so as to prevent the pixels 16 of the background 18a from appearing in the pixels 16 of the foreground 18b after mapping.

From the above, the backward depth mapping method for stereoscopic image synthesis of the present invention mainly uses the backward depth mapping algorithm and the error value algorithm, mappings the first coordinate and the first (predetermined) depth value of pixel of virtual view to the second coordinate and the second depth value of pixel of reference view, calculates the error value corresponding to the first (predetermined) depth value of pixel of the virtual view based on the mapped second coordinate and second depth value of pixel of the reference view, and determines the third (actual) depth value of pixel of the virtual view based on the error value corresponding to the first (predetermined) depth value of pixel of the virtual view.

Therefore, the present invention can solve the problem in the prior art that the pixel gaps are generated between the plurality of pixels of the virtual view, so as to avoid the virtual view of the stereoscopic image generating cracks. In the meanwhile, the present invention can overcome the situation in the prior art that the pixels of the backward of the reference view are mapped into the pixel gaps of the pixels of the virtual view, so as to avoid the pixels of the backward appearing in the crack of the frontward after mapping, further improve the quality of the virtual view of stereoscopic image synthesis.

The above embodiments are merely used to describe the principle, characteristic, and effect of the present invention, but not to limit the present invention. Anyone with ordinary skills in the arts can modify or change the above embodiments without departing from the spirit and scope of the disclosure. Any use of the present invention complete disclosure and equivalent changes and modifications, all of the following claims should be covered. Accordingly, the scope of the present invention should follow the appended claims.

What is claimed is:

1. A backward depth mapping method for stereoscopic image synthesis, comprising:
    providing a first coordinate and a first depth value of a pixel of a virtual view in a stereoscopic image;
    calculating a second coordinate and a second depth value of a pixel of a reference view based on the first coordinate and the first depth value of the pixel of the virtual view, wherein the reference view is obtained by mapping the virtual view;
    calculating an error value corresponding to the first depth value of the pixel of the virtual view based on the second coordinate and second depth value of the pixel of the reference view; and
    determining a third depth value of the pixel of the virtual view based on the error value corresponding to the first depth value of the pixel of the virtual view,
    wherein the error value is calculated based on the following error value algorithm:

$$E = \min_{\substack{u_r=floor(u') \text{ or } ceil(u') \\ v_r=floor(v') \text{ or } ceil(v')}} [(u_r - u')^2 + (v_r - v')^2 + (D(u_r, v_r) - z')^2]$$

wherein E is the error value, $u_r$, $v_r$, and $D(u_r, v_r)$ are horizontal coordinates, vertical coordinates and depth values of the pixel of the reference view, respectively, floor(u') and floor(v') are floor functions to obtain the horizontal coordinate u' and the vertical coordinate v', respectively, ceil(u') and ceil(v') are ceiling functions to obtain the horizontal coordinate u' and the vertical coordinate v', respectively, and min represents to obtain the minimum value, and wherein when the error value corresponding to a previous first depth value of the pixel of the virtual view is smaller than a threshold value, the previous first depth value of the pixel of the virtual view is used as the third depth value of the pixel of the virtual view.

2. The backward depth mapping method according to claim 1, wherein the first coordinate of the pixel of the virtual view includes a horizontal coordinate and a vertical coordinate and the first depth value of the pixel of the virtual view is obtained from one of a series consisting of a plurality of integer values.

3. The backward depth mapping method according to claim 1, further comprising determining whether the error value corresponding to the first depth value of the pixel of the virtual view is smaller than the error value corresponding to the previous first depth value of the pixel of the virtual view before determining the third depth value of the pixel of the virtual view.

4. The backward depth mapping method according to claim 3, wherein a next first depth value of the pixel of the virtual view is provided if the error value corresponding to the first depth value of the pixel of the virtual view is smaller than the error value corresponding to the previous first depth value of the pixel of the virtual view.

5. The backward depth mapping method according to claim 3, further comprising determining whether the error value corresponding to the previous first depth value of the pixel of the virtual view is smaller than the threshold value if it is determined that the error value corresponding to the first depth value of the pixel of the virtual view is larger than the error value corresponding to the previous first depth value of the pixel of the virtual view.

6. The backward depth mapping method according to claim 1, wherein the second coordinates and the second depth value of the pixel of reference view are calculated based on the following backward depth mapping algorithm:

$$A^{-1}\left(z_v \begin{bmatrix} u_v \\ v_v \\ 1 \end{bmatrix} - b\right) = z' \begin{bmatrix} u' \\ v' \\ 1 \end{bmatrix}$$

wherein $A^{-1}$ is an inverse matrix, b is a 3 by 1 matrix, $u_v$, $v_v$, and $z_v$ are the horizontal coordinates, the vertical coordinates and the depth values of the pixel of the virtual view, respectively, and u', v', and z' are the horizontal coordinates, the vertical coordinate and the depth values of the pixel of the reference view, respectively.

7. The backward depth mapping method according to claim 6, wherein the following backward depth mapping algorithm further comprises the following formulas:

$A = Q_v Q_r^{-1}$  $b = Q_v(c_r - c_v)$ $Q_v = K_v \cdot R_v, Q_r = K_r \cdot R_r$ $c_r = -R_r^T \cdot t_r, c_v = -R_v^T \cdot t_v$ wherein A is a 3 by 3 matrix, $K_v$ and $K_r$ are internal parameters of the virtual view and the reference view, respectively, $R_v$ and $R_r$ are a rotation matrix of the virtual view and the reference view, respectively, $t_v$ and $t_r$ are translation vectors of the virtual view and the reference view, respectively, and T is a transpose matrix.

* * * * *